United States Patent
Bollegue et al.

(10) Patent No.: US 9,149,888 B2
(45) Date of Patent: Oct. 6, 2015

(54) MACHINE FOR JOINING THE ENDS OF STEEL STRIPS WHICH MACHINE IS SUITED TO THE INDUCTION HEAT TREATMENT OF JOINING WELDS

(75) Inventors: Fabien Bollegue, Saint Chamond (FR); Herve Thomasson, Seyssuel (FR)

(73) Assignee: PriMetals Technologies France SAS, Savigneux (FR)

(*) Notice: Subject to any disclaimer, the term of this patent is extended or adjusted under 35 U.S.C. 154(b) by 304 days.

(21) Appl. No.: 13/642,969

(22) PCT Filed: Aug. 12, 2010

(86) PCT No.: PCT/EP2010/061784
§ 371 (c)(1),
(2), (4) Date: Oct. 23, 2012

(87) PCT Pub. No.: WO2011/131253
PCT Pub. Date: Oct. 27, 2011

(65) Prior Publication Data
US 2013/0037530 A1    Feb. 14, 2013

(30) Foreign Application Priority Data
Apr. 23, 2010   (EP) .................................. 10290218

(51) Int. Cl.
| | |
|---|---|
| *B23K 20/12* | (2006.01) |
| *B23K 26/26* | (2014.01) |
| *B23K 26/30* | (2014.01) |
| *B23K 31/02* | (2006.01) |
| *C21D 1/42* | (2006.01) |
| *B21B 15/00* | (2006.01) |

(52) U.S. Cl.
CPC ............... *B23K 26/26* (2013.01); *B23K 26/422* (2013.01); *B23K 31/02* (2013.01); *C21D 1/42* (2013.01); *B21B 15/0085* (2013.01); *B23K 2201/16* (2013.01)

(58) Field of Classification Search
CPC ........... B23K 11/0073; B23K 2201/18; B23K 2203/04; B23K 26/26; B23K 26/246
USPC .......... 219/121.63, 121.64, 121.85, 101, 102, 219/104, 158
See application file for complete search history.

(56) References Cited

U.S. PATENT DOCUMENTS 4,623,777 A * 11/1986 Aihara et al. ............... 219/121.6
4,626,651 A * 12/1986 Taniguchi et al. ....... 219/121.63
(Continued)

FOREIGN PATENT DOCUMENTS

DE          841 179         6/1952
EP          1 157 753 A2   11/2001
(Continued)

*Primary Examiner* — Brian Jennison
(74) *Attorney, Agent, or Firm* — Laurence A. Greenberg; Werner H. Stemer; Ralph E. Locher

(57) ABSTRACT

A joining machine for joining ends of successive strips in a strip treatment installation includes a device welding a first end of a strip to a second end of another strip, a first pair of symmetrical clamping jaws including a first upper and a first lower clamping jaw gripping the first end of a strip, a second pair of symmetrical clamping jaws including a second upper and a second lower clamping jaw gripping the second end of a strip, the clamping jaws holding and positioning the first end facing the second end for welding the ends together. At least two clamping jaws of the two pairs each include a part for contacting one of the ends to be welded to another end. The part has a geometry and at least one constituent material reducing a strength of eddy currents likely to be created in the clamping jaw by electromagnetic induction.

15 Claims, 4 Drawing Sheets

(56) References Cited

U.S. PATENT DOCUMENTS 5,747,768 A * 5/1998 Peru et al. ................ 219/121.63
6,462,299 B1 * 10/2002 Takeda et al. ............ 219/121.14
7,820,938 B2 10/2010 Gobez et al.
8,445,811 B2 * 5/2013 Barjon et al. ............ 219/121.64

FOREIGN PATENT DOCUMENTS

| EP | 1 159 190 A1 | 11/2005 |
| JP | 8174254 A | 7/1996 |
| JP | H0985307 A | 3/1997 |
| JP | 2001334302 A | 12/2001 |

* cited by examiner

MACHINE FOR JOINING THE ENDS OF STEEL STRIPS WHICH MACHINE IS SUITED TO THE INDUCTION HEAT TREATMENT OF JOINING WELDS

BACKGROUND OF THE INVENTION

1 Field Of The Invention:

The present invention relates to clamping jaws of a machine for joining strips By welding, a heat treatment device for the heat treatment of a weld joining Two successive ends of strip by electromagnetic induction and a joining machine suited to the heat treatment by induction of welds for joining steel strips.

The invention relates in particular to welds for joining steel strips running continuously in a cold rolling installation or an installation for treatment such as surface pickling, continuous annealing, electroplating or dip coating and in particular to welds produced using a laser beam and more particularly to heat treatment preceding and/or immediately following the production of said welds. In the rest of this document, the expression "treatment installation" will be used to refer to rolling installations or to the above mentioned treatment installations.

In order to improve the productivity of steel strip treatment installations, avoiding in particular the transformation of said strips reel by reel, modern high-capacity treatment installations are capable of operating continuously by joining the ends of steel strips supplied successively in the form of a reel at the input to the treatment installation, the tail of a strip at the end of treatment being joined to the head of a new strip inserted in the input of the treatment installation.

During this joining operation, the movement of the two ends of strip to be welded into the treatment installation, i.e. the tail of the strip at the end of treatment and the head of the new strip to be treated, is stopped and the sections downstream of the treatment installation (i.e. the sections situated after said tail of the strip according to the direction of travel of the strip) are fed by a strip accumulation device previously filled during the period of time separating two successive joins. Such a joining operation is well known to a person skilled in the art whose efforts relate to the speed of the joining operation, so as to limit the stoppage time for the end of strip and, consequently, the capacity and cost of the accumulation devices.

The joining operation is undertaken by a welding joining machine or welding machine which comprises, in addition to the welding device itself, two pairs of clamping jaws intended to immobilize the strips during joining by welding, respectively a first pair of clamping jaws intended to immobilize the tail of the strip engaged in a section of the treatment installation situated downstream in the direction of travel of the strip and a second pair of clamping jaws intended to immobilize the head of the new strip introduced upstream of the joining machine. Different welding methods used by different welding devices are known to a person skilled in the art. This involves for example flash butt welding, resistance seam welding, MIG, TIG or laser or laser hybrid welding.

The welding joining machine must be capable of producing a high-quality weld. In fact, the breakage of a poor-quality weld during movement of the strip in the treatment installation, or even the need to re-make a weld deemed incorrect or of poor quality may give rise to serious production losses. The decisive elements in the quality of a weld are essentially:

the metallurgical quality of the welded joint, particularly for steels susceptible to metallurgical alterations of the zone thermally affected by the welding operation, the geometry of the welded section, which should ideally be free from excessive thickness and/or under-thickness in relation to the section of the strip, the continuity and compactness of the welded joint.

The metallurgical quality of the welded joint, or of the weld, depends essentially on the welding method used and the thermal cycle it induces in the zone affected by welding, and the different pre- and post-heating or annealing treatments applied locally in the welding machine itself or immediately downstream of the welding machine.

The geometry of the welded section depends on the welding method and the means of completing the weld produced after welding. For example, flash butt welding produces a bead which has to be planed and flash butt welding machines are generally equipped with a planing unit integrated into the welding machine. Resistance seam welding also produces an excessive thickness due to the overlapping of the sheets to be welded and which usually has to be flattened by roller devices integrated into the welding machine. Laser welding allows fine management of the welded section also associated with a very limited zone affected by heat.

The continuity and compactness of the welded joint depend essentially on the welding parameters used. These welding parameters are mostly electrical parameters which are easily and reliably manageable. However, another parameter is vital in order to guarantee the continuity and compactness of the welded joint. This involves the straightness of the edges to be welded and their relative positioning during welding. The edges to be welded refer to the end of the tail of the strip at the end of treatment opposite the end of the new strip engaged in the treatment installation.

In order to guarantee the quality of the joining weld, it is necessary that the ends of the strips to be welded are perfectly aligned and rectilinear. For this purpose, welding machines generally include said two pairs of clamping jaws intended to immobilize the ends of strips intended to be joined by welding. Generally, said ends of strips are immobilized in the clamping jaws with a slight overhang resulting from their precise and clean cropping by means of shears integrated into the welding machine or, in certain cases, from their cutting by means of a laser beam. Also, centering devices integrated into or attached to the welding machine make it possible to align the ends of strips before their immobilization in the clamping jaws.

The considerable broadening of the ranges of steel grades and thicknesses treated in treatment installations and the ever increasing productivity requirements have led to more and more frequent use of welding machines involving the laser welding method. This laser method in fact makes it possible to extend the range of products able to be welded toward very fine thicknesses. It also makes it possible to limit the zones thermally affected for a very wide variety of steel grades, including special metallurgy steels developed for the automobile industry. However, in view of the small thickness of the laser beam, the relative positioning of the edges to be welded has to be extremely precise, as described in the applicant's application EP 1591190.

Although the laser welding method, owing to the extreme concentration of the welding energy, results in reduced affected zones, numerous steel grades with high characteristics are nonetheless still susceptible to hardening and, correlatively, to fragilization. In order to prevent this fragilization and this hardening, heat treatment of the weld may be necessary. Different types of heat treatment of the weld may be used, either by annealing after welding, the purpose of which is metallurgically to restore acceptable ductility to the weld, or by pre-heating capable of reducing the cooling rate of the weld and thus limiting its hardening.

In particular, annealing of joining welds by means of heat treatment by electromagnetic induction is known to a person skilled in the art. For this purpose, a heat treatment device using electromagnetic induction is placed downstream of the welding machine. Once the joint has been welded, the clamping jaws holding the ends of strips in place are opened and the welded joint is moved in the direction of travel of the strip to the electromagnetic induction heat treatment device, where said welded joint is processed by annealing. The annealing of the joining weld by means of an electromagnetic induction heat treatment device situated downstream of the welding machine unfortunately implies a great extension of the welding time, requiring a reduction in the speed of travel downstream of the accumulation device or greater accumulation capacities. Also, the time elapsing between the completion of the welded joint and the start of annealing by means of the electromagnetic induction heat treatment device is capable of harming the quality of the weld.

Heat treatment by electromagnetic induction is also described in patents for the continuous production of welded metal tubes from steel strips, such as for example in patent JP 08-174254. In this case, an electromagnetic induction heat treatment device follows the movement of a laser welding head in order to anneal the weld immediately after welding by the welding head. However, the implementation of such an electromagnetic induction heat treatment device following the welding head of the welding machine is not applicable to the weld joining of heads and tails of strips by a strip joining welding machine.

In fact, the joining of strips depends on the use of said clamping jaws, while the latter are not present in the case of tube welding. Said clamping jaws are needed for the precise positioning of the ends of the strips to be welded, in order to guarantee the quality of the weld. Also, in order to guarantee the best possible positioning of the two edges to be welded to one another, and particularly in the case of thin strips (for example less than 1 millimeter thick), the overhang of the edges to be welded—i.e. their protuberance with respect to the clamping jaws and thus the separation of said pairs of clamping jaws from each other, or the inter-jaw space—must be as small as possible.

Owing to this minimization of the inter-jaw space, it is difficult to position an electromagnetic induction heat treatment device close to the weld capable of heating the weld without inducing great risks of heating the clamping jaws by circulation of electrical currents induced by the electromagnetic field (i.e. eddy currents) and consequently disturbances in the heating of the weld or without reducing the precision of the positioning of the ends of strips to be welded. In fact, in the case of joining thin strips, the choice of an inter-jaw space making it possible to limit said heating of the clamping jaws, or simply to free a space for the positioning of the induction treatment device, may result in excessive overhang of the edges to be welded, which consequently no longer allows for the correct relative positioning of said edges to be welded. In particular, in the case of joining extremely thin strips, with a thickness for example between 0.1 and 0.4 mm, the ends of strips to be welded are cut by laser, and not using shears. It follows that no space is placed between the lower clamping jaws (i.e. positioned beneath the strip to be joined) so as to allow the passage of shear blades intended to cut said ends. Consequently, it is impossible to position an electromagnetic induction heat treatment device beneath the strip without positioning the clamping jaws far away from the weld so as to free a space for said heat treatment device, with catastrophic consequences for the quality of positioning of the edges to be welded, or without opening and separating the clamping jaws after welding, with consequences for the complete welding and annealing cycle time, and making it impossible, in this case, to carry out pre-heating of the zone to be welded.

BRIEF SUMMARY OF THE INVENTION

An object of the present invention is to propose a strip joining machine suitable for induction heat treatment of a weld of an end of strip to another end of another strip and allowing for precise positioning of said ends in order to guarantee the quality of the weld, while avoiding the abovementioned problems capable of reducing said quality of the weld. In particular, said joining machine should be capable of limiting electromagnetic interaction between the magnetic field intended for heat treatment before or after welding and parts of said joining machine capable of interacting with said magnetic field, generating eddy currents capable of deteriorating the clamping jaws of the machine and disturbing the treatment of said weld.

For this purpose, a joining machine, clamping jaws of said joining machine and an induction heat treatment device of said joining machine are proposed below.

Another object of the present invention is clamping jaws of a strip welding joining machine capable of clamping strips which can be successively welded to one another by said joining machine of a strip treatment installation, characterized in that at least one part of said clamping jaws capable of contacting an end of strip intended to be welded to another end of strip, in particular capable of contacting an overhang of said end of strip, is characterized by a geometry, in particular suitable for an induction head of a device for the induction heat treatment of said weld and at least one constituent material, each, i.e. said geometry and said constituent material, making it possible to reduce the intensity of eddy currents capable of being created in said clamping jaws by electromagnetic induction, or in other words, said geometry and said constituent material of said part are capable of limiting the heating of said clamping jaws under the action of a magnetic field of the induction heat treatment device. Said part of the clamping jaws is thus a part with little interaction with a magnetic field.

The present invention also proposes an induction heat treatment device of a strip welding joining machine suitable for the heat treatment of a weld joining two successive ends of strips by electromagnetic induction before or after production of said weld, said treatment device also being adaptable to a machine for joining said strips comprising a welding device capable of welding said successive ends of strips, two pairs of clamping jaws capable of immobilizing said ends of strip, of which at least two clamping jaws of said two pairs of clamping jaws are clamping jaws characterized in that at least one part of each of said clamping jaws, said part being capable of contacting an end of strip intended to be welded to another end of strip, is characterized by a geometry, in particular suitable for an induction head of a device for the induction heat treatment of said weld and at least one constituent material, each, i.e. said geometry and said constituent material, making it possible to reduce the intensity of eddy currents capable of being created in said clamping jaws by electromagnetic induction by said heat treatment device, said heat treatment device being characterized by an induction head a geometric shape of which is complementary to the geometric shape of said part of each of said two clamping jaws.

Finally, another object of the present invention is a joining machine intended to join successive ends of strip of a strip treatment installation, said joining machine comprising a device to weld a first end of strip to a second end of another strip, two pairs of symmetrically arranged clamping jaws, respectively a first pair of clamping jaws comprising a first upper clamping jaw and a first lower clamping jaw capable of squeezing, i.e. capable of tightly clamping between them, said first end of strip, and a second pair of clamping jaws comprising a second upper clamping jaw and a second lower clamping jaw capable of squeezing said second end of strip, intended to hold and to position said first and second ends of strip facing one another for welding said ends of strips to one another, characterized in that at least two clamping jaws of said two pairs of clamping jaws are clamping jaws characterized in that at least one part of each of said clamping jaws, said part being capable of contacting and end of strip intended to be welded to another end of strip, is characterized by a geometry, in particular suitable for an induction head of a device for the induction heat treatment of said weld and at least one constituent material, each, i.e. said geometry and said constituent material, making it possible to reduce the intensity of eddy currents capable of being created in said clamping jaws by electromagnetic induction by said heat treatment device, said heat treatment device being characterized by an induction head a geometric shape of which is complementary to the geometric shape of said part of each of said two clamping jaws. In particular, said joining machine is characterized in that it comprises said heat treatment device and in that the latter is adapted to said part of said clamping jaws.

The present invention thus proposes a constructional arrangement of the joining machine capable of ensuring an absence of mechanical interference between said heat treatment device and the clamping jaws of said joining machine, while also guaranteeing little electromagnetic interaction between said clamping jaws of said joining machine and a magnetic field capable of being generated by the heat treatment device by induction. Also, it allows for retention or maintenance of the clamping of the ends of strips to be welded before and during the welding and heat treatment operations. In other words, the constructional arrangements (i.e. the geometry and constituent material of said part of the clamping jaws, the geometry of the induction head of the heat treatment device) of the joining machine according to the present invention make it possible to solve the problems associated with the need to keep the pairs of clamping jaws close together at least during the welding and heat treatment operations in order to maintain the correct positioning of the ends or edges of strips to be welded, the precision of positioning of which governs the quality of the weld.

In particular, according to the present invention, said part comprised in the clamping jaws is capable of reducing the intensity of the eddy currents capable of being created in said clamping jaws by electromagnetic induction generated by said heat treatment device during said heat treatment. In fact, because of its geometry and its constituent material, for example an insulating material, i.e. not conducting electricity, said part requires on the one hand a distance of separation between the source of the magnetic field capable of being induced by the heat treatment device close to the end of said strip and another part of the clamping jaw capable of being deteriorated and/or of disturbing the treatment of the weld by being heated by induction (for example, by induction of eddy currents in metal parts of the clamping jaws), and defines on the other hand a zone in said clamping jaws free from heating by induction capable of deteriorating the quality of said weld.

In particular, said part forms a projection capable of extending in the direction of an end of strip, covering, according to a first length, the entire width of the clamping jaw, and a width and a length perpendicular to said first length of which are capable of being defined as a function of at least one dimension of the induction head.

In other words, the clamping jaws according to the invention comprise at least two parts, on the one hand said part claimed above and characterized by little interaction between its constituent material and any magnetic field and said other part capable of interacting with a magnetic induction field, in particular by heating greatly and risking deterioration to a weld close to said other part. Little interaction of the constituent material with a magnetic field is taken to mean that a magnetic field generated by a device for the heat treatment by induction of a joining weld does not induce sufficient heating of said constituent material for it to be deteriorated and/or disturb the treatment of the weld.

Said part of the clamping jaws also being capable of contacting said end of strip to be welded, it is also the part of the clamping jaws capable of being closest to the induction heat treatment device, in particular during said heat treatment by induction. Thus, said other part of the clamping jaws is in particular separated from said heat treatment device by said separation distance, which is a function of the geometry of said part. This separation distance guarantees a weaker magnetic field in said other part than in said part, since the effect of the magnetic field at a point decreases when the distance from this point to the source of the magnetic field increases. Since said part is little or not at all affected by the magnetic field of said induction heat treatment device, it will not be heated sufficiently to be deteriorated or to disturb the treatment of the weld.

The constituent material of said part is preferably an insulating material in order to prevent its heating by induced electrical currents, for example a material characterized by a resistivity greater than $10^9$ Ω·cm or in particular greater than $10^{12}$ Ω·cm at the maximum operating temperature of the joining machine, in particular under the effect of heating due to the proximity of the weld and a zone of the weld treated by magnetic induction, for example between 20° C. and 800° C.

Also, the clamping jaws according to the invention are in particular characterized in that said material has a relative magnetic permeability below 5, preferably equal to 1. Furthermore, in order to evacuate heat due to welding and heat treatment, the thermal conductivity of said material is preferably greater than 10 W m$^{-1}$·K$^{-1}$. Also, said constituent material preferably has a limited thermal expansion capacity in order to avoid any thermal shock effect. For this purpose, said material is in particular characterized by a coefficient of thermal expansion of between 2 and $10 \cdot 10^{-6}$·K$^{-1}$.

In particular, said material for example forms part of the family of industrial ceramics such as $Si_3N_4$, $Al_2O_3$, AlN. In view of the cost of this type of ceramic materials, the geometry of said part is capable of guaranteeing minimum volume and complexity of said part, while providing for minimization of the heating by induction of said clamping jaw. Said part has for example a geometry in the shape of a wedge placed at one end of the clamping jaw, the rest of the clamping jaw being for example characterized by a traditional metal construction.

In particular, said geometry of said part is a geometry complementary to a geometry of said electromagnetic induction heat treatment device, in particular to a geometry of an induction head of said heat treatment device, said heat treatment device being, also and in particular, capable of being connected to a welding device of said joining machine. Said geometry is also intended on the one hand to reduce a magnetic induction flux capable of being induced by said electromagnetic induction heat treatment device in said jaw and on the other hand to provide for heat treatment by electromagnetic induction before or after the welding of an end of strip to another end of strip, free from any movement of said jaw relative to said end of strip. The dimensions of said part of said clamping jaw depend in particular on the size of the induction treatment device in a direction perpendicular to the joining weld and on a tolerable air gap between the induction head of said heat treatment device and the strip in order to ensure correct heating.

In particular, the induction head of said heat treatment device is capable of comprising a coil and an electrical device suitable for induction heat treatment of a strip joining weld. As an example, heating of a weld of an end of strip to another end of strip to a temperature of 300 to 800° C., said strips having a thickness of for example between 0.1 and 4 mm, and the speed of movement of the induction head parallel to the weld being for example between 5 and 15 m/min, can be undertaken by an induction coil with a width (dimension perpendicular to the weld) of between 5 and 10 mm crossed by an electrical induction current with a frequency of 10 to 500 kHz and a power of 50 to 100 kW, tolerating an air gap with the strip of 6 to 12 mm for example.

Also, the heat treatment device according to the invention is in particular characterized in that it comprises a means of moving said induction head capable of correlating a movement of said induction head with a movement of said welding device or more precisely of a welding head of said welding device. In particular, and especially in the case of progressive welding characterized by a movement of the welding head along the edges of strips to be welded, the heat treatment device is characterized in that it comprises at least one mobile induction head, for example situated upstream of the welding head and intended for annealing or situated downstream of the welding head and intended for pre-heating. In particular, the heat treatment device is capable of comprising two induction heads, a first mobile induction head situated upstream of the welding head and intended for said annealing, and a second induction head situated downstream of the welding head and intended for pre-heating. In particular, in the case of a welding machine designed to weld in two directions of movement, the mobile induction heads are capable, depending on their adjustment, of providing for either pre-heating or annealing. Advantageously, said induction head is in particular either capable of being coupled to the device for moving the welding head by a coupling means, or capable of being moved by means of said movement means. In all cases, the movement of the induction head may be synchronous or asynchronous with the movement of said welding head.

The present invention also proposes that said first and second upper clamping jaws and/or said first and second lower clamping jaws of the joining machine are in particular clamping jaws characterized in that each one comprises at least said part with little interaction with the magnetic field, i.e. that at least one part of said clamping jaws, said part being capable of contacting an end of strip intended to be welded to another end of strip, is characterized by a geometry and at least one constituent material each providing for a reduction in the intensity of eddy currents capable of being created in said clamping jaws by electromagnetic induction.

Also, the induction head of the induction heat treatment device is advantageously capable of moving in particular above or below the ends of strips to be welded or of said weld. Preferably, if it is necessary to retain, throughout the welding, a support to fill a space released for lower shear blades and ensure the correct relative positioning of the edges to be welded, said induction head is then capable of moving between the upper clamping jaws of the joining machine, said upper clamping jaws each comprising said part with little interaction with the magnetic field. Otherwise, said induction head is capable of moving between the upper or lower clamping jaws of the joining machine. In all cases, the clamping jaw close to said induction head (i.e. capable of being sufficiently heated by induction to harm the weld) comprises said part with little interaction with the magnetic field. Also, the joining machine according to the invention is characterized in that it comprises a support at least partially made up of said constituent material of said part with little interaction with the magnetic field, and can be positioned, during welding, under said first and second ends of strips intended to be welded, said support being intended to cooperate with said clamping jaws comprising said part with little interaction with the magnetic field, in order to provide for clamping of said first and second ends of strips.

BRIEF DESCRIPTION OF THE SEVERAL VIEWS OF THE DRAWING

Exemplary embodiments and applications of the present invention are provided using the following figures.

DESCRIPTION OF THE INVENTION

Figure 1:
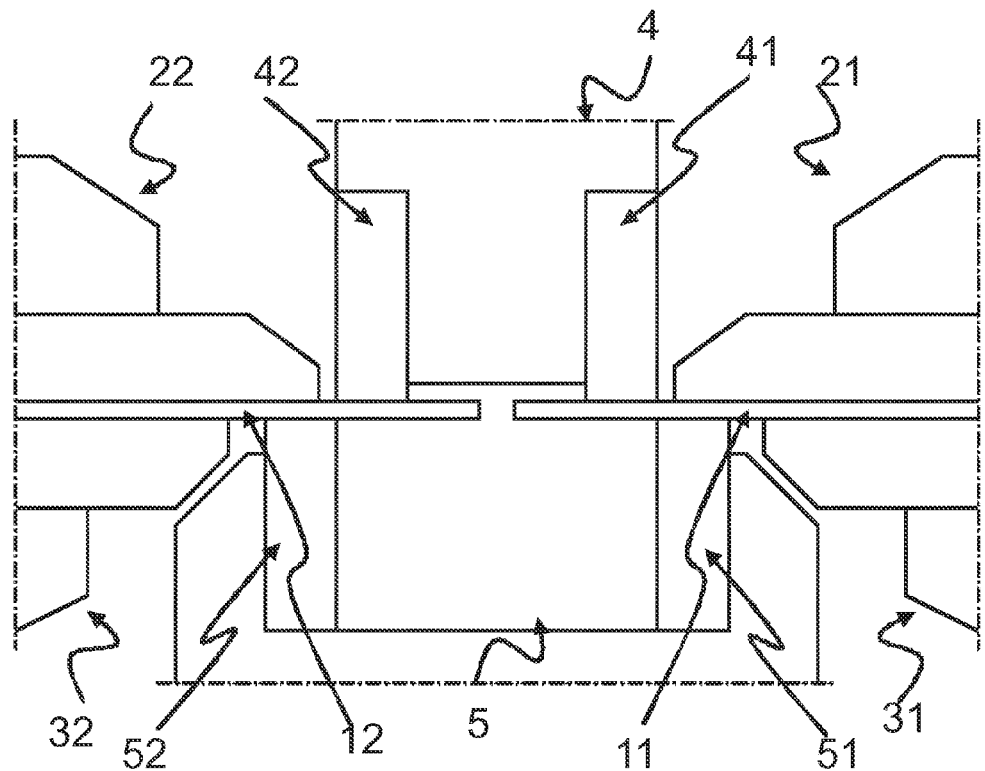
FIG. 1 Joining machine according to the prior art, presented in a configuration for cutting ends of strips before welding FIG. 2 Joining machine according to the prior art, presented in a configuration for strip welding according to a first variant FIG. 3 Joining machine according to the prior art, presented in a configuration for strip welding according to a second variant FIG. 4 Joining machine according to the prior art, comprising a heat treatment device FIG. 5 Exemplary embodiment of a joining machine according to the invention FIG. 6 Exemplary induction heating cycles for a laser joining weld

FIG. 1 presents an exemplary embodiment of a joining machine according to the prior art in strip shearing configuration. An end of strip, more precisely, a tail of a first strip 11 is clamped in a first pair of clamping jaws at the output from the joining machine, respectively a first upper clamping jaw 21 and a first lower clamping jaw 31. Another end of another strip, more precisely a head of a second strip 12 following said first strip is clamped in a second pair of clamping jaws at the input to the joining machine, respectively a second upper clamping jaw 22 and a second lower clamping jaw 32. The configuration of the joining machine presents in particular said clamping jaws in position to shear the two ends of the two strips. For this purpose, a shearing unit of the joining machine includes an upper blade holder 4 capable of holding upper blades 41, 42, and a lower blade holder 5 capable of holding lower blades 51, 52. The tail of the first strip 11 is sheared between the upper blade 41 and the lower blade 51 capable of shearing said tail simultaneously with the shearing of the head of the second strip 12 between the upper blade 42 and the lower blade 52 intended for shearing a single end of strip. The position of the two lower blades 51, 52 with respect to the upper blades 41 and 42 requires that the lower clamping jaws 31, 32 are set back relative to the upper clamping jaws 21, 22.

Figure 2:
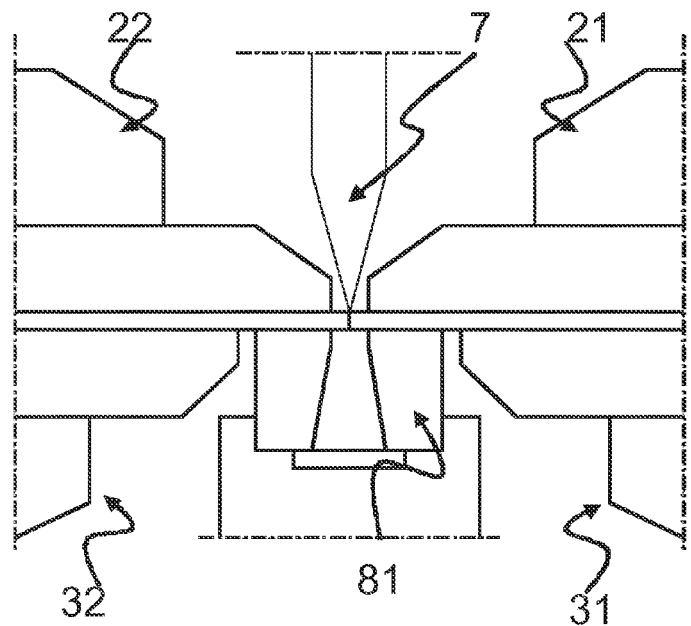

FIG. 2 presents the same strip joining machine as described in FIG. 1, but in a configuration for welding ends of strips according to a first variant. The clamping jaws 21, 31, 22, 32 are in close welding position. A retractable support 81 provides for clamping of the head of the second strip 12 and the tail of the first strip 11 in cooperation with the upper clamping jaws 21, 22. A laser beam 7 provides for the weld joining of the head of the second strip 12 with the tail of the first strip 11.

Figure 3:
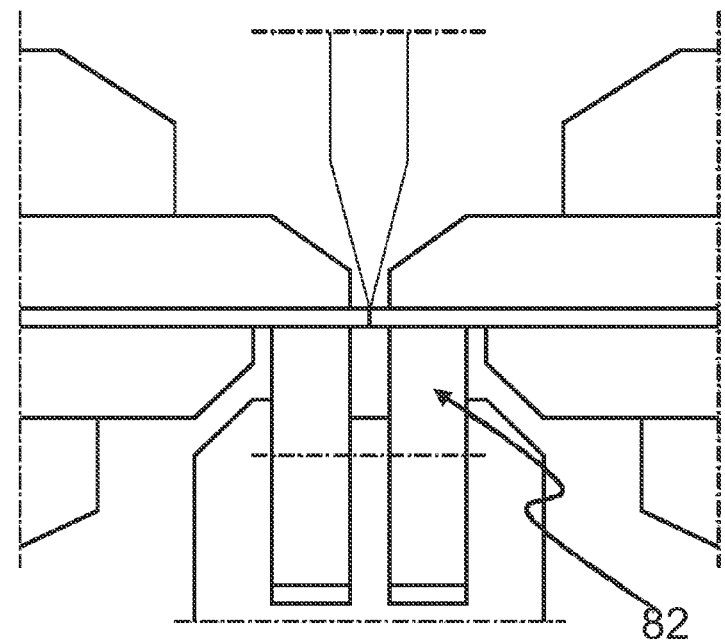

FIG. 3 presents the same strip joining machine as described in FIG. 2, but according to a second variant of the configuration for welding ends of strips. According to this second variant, the retractable support 81 previously described is replaced by two pressure rollers 82 which provide for clamping of the head of the second strip 12 and the tail of the first strip 11 in cooperation with the upper clamping jaws 21, 22.

Figure 4:
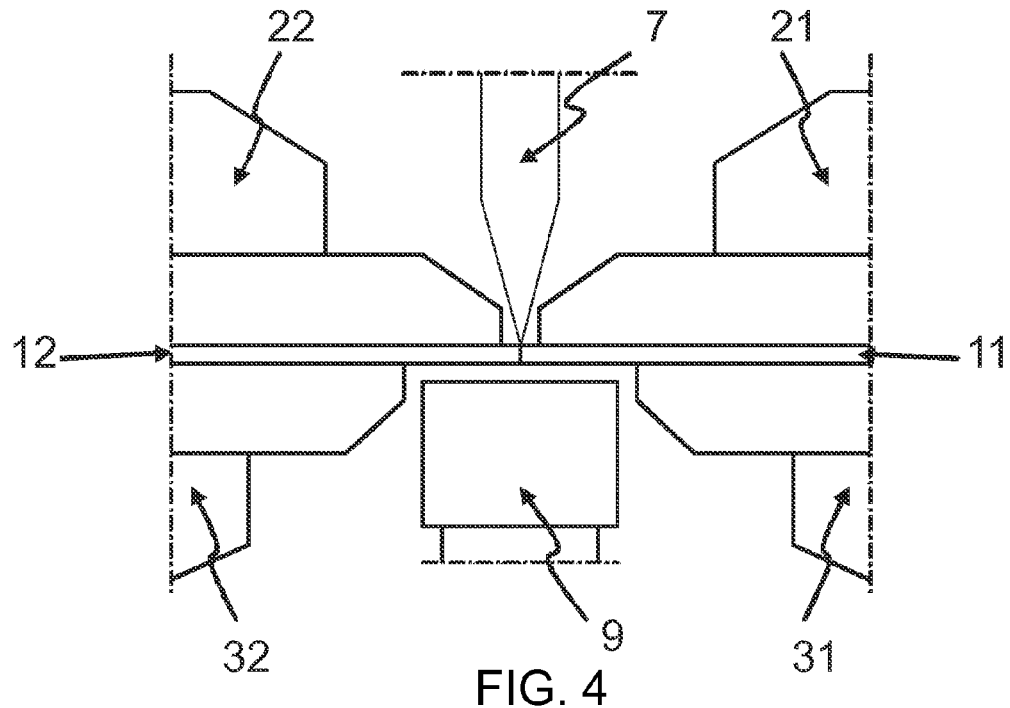

FIG. 4 shows an exemplary embodiment of an induction heat treatment device according to the prior art included in the joining machine as described previously in FIG. 1. An induction head 9 of said induction treatment device is placed beneath the head of the second strip 12 and the tail of the first strip 11, in a space between the lower clamping jaws 31, 32 required by the passage of the lower shearing blades 51, 52, as illustrated in FIG. 1. There is a small air gap between the ends of strips and the induction head 9. The arrangement of the induction head does not allow a support 81 to take part in the clamping needed for the correct relative positioning of the head of the second strip 12 relative to the tail of the first strip 11.

Figure 5:
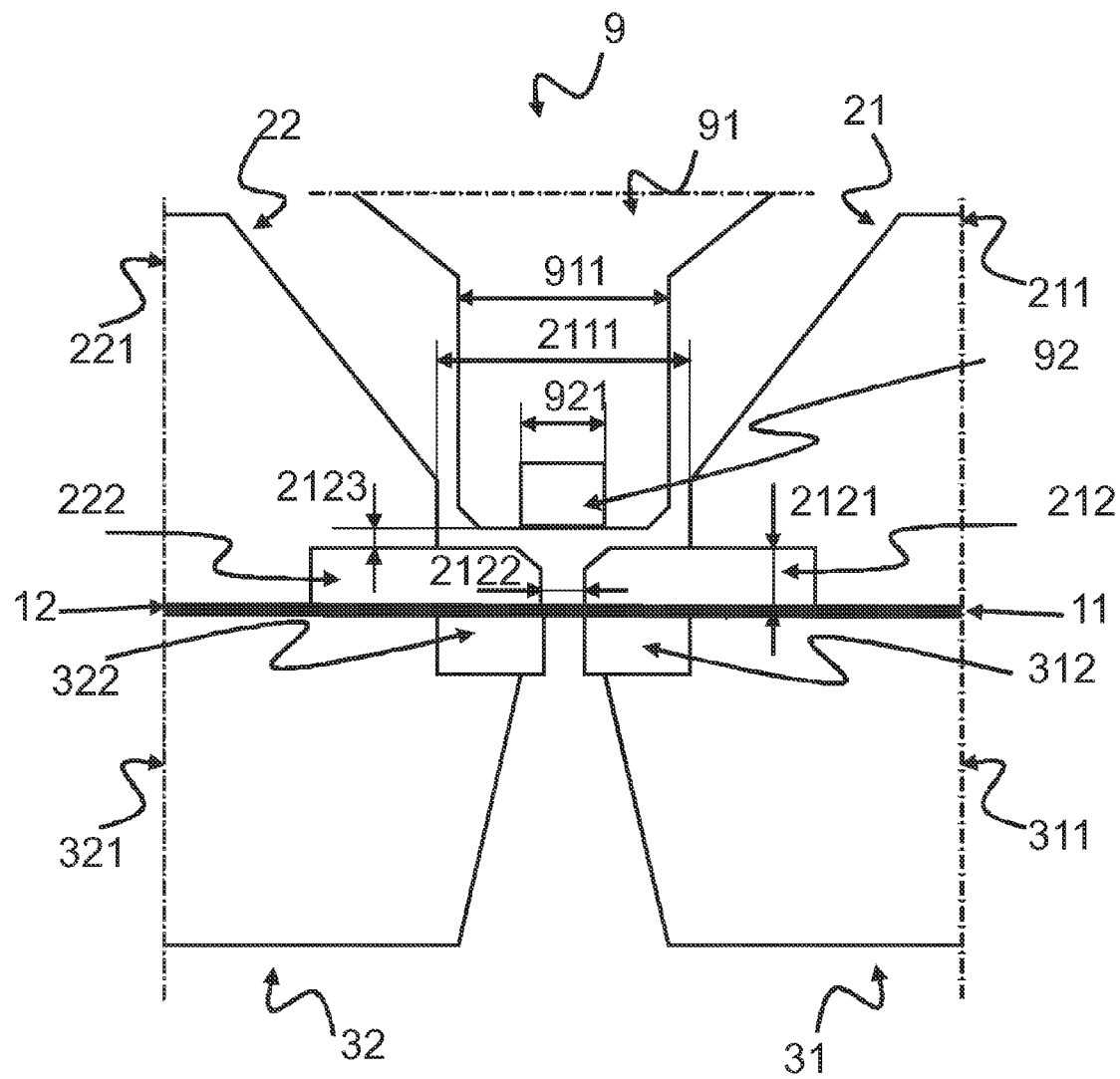

FIG. 5 presents an exemplary embodiment of a joining machine according to the invention. Said joining machine is intended for joining successive ends of strips of a strip treatment installation. Said joining machine comprises in particular a device (not represented) for welding a first end of strip 12, for example a head of a first strip, with a second end of another strip 11, for example a tail of a second strip, two pairs of symmetrically arranged clamping jaws, respectively a first pair of clamping jaws comprising a first upper clamping jaw 22 and a first lower clamping jaw 32 capable of squeezing, i.e. capable of tightly clamping between them, said first end of strip 12, and a second pair of clamping jaws comprising a second upper clamping jaw 21 and a second lower clamping jaw 31 capable of squeezing said second end of strip 11. Said pairs of clamping jaws are in particular intended to hold and to position said first and second ends of strip facing one another for welding said ends of strips to one another.

In particular, at least one clamping jaw is characterized in that it comprises at least one part 322, 222, 312, 212 characterized by a geometry and at least one constituent material each, i.e. said geometry and said constituent material, making it possible to reduce the intensity of eddy currents capable of being created in said clamping jaws by electromagnetic induction by a heat treatment device, said heat treatment device being characterized by an induction head 9 a geometric shape of which is complementary to the geometric shape of said part of said clamping jaw. Said part is a part with little interaction with an induction magnetic field and is also capable of contacting an end of strip intended to be welded. For example, the part 222 of the first upper clamping jaw 22 is capable of contacting a first face of the head of a second strip 12 and the part 322 of the first lower clamping jaw 32 is capable of contacting a second face of the head of the second strip 12. Also, the part 212 of the second upper clamping jaw 21 is capable of contacting a first face of the tail of a first strip 11 and the part 312 of the second lower clamping jaw 31 is capable of contacting a second face of the tail of the first strip 11.

In particular, said joining machine is characterized in that it comprises said heat treatment device intended for heat treatment by induction, before or after the production of a weld joining the two ends of strips, and in that the latter is adapted to said part 222, 322, 212, 312 of said clamping jaws. The geometry of said part is in particular adapted to the induction head 9 of the device for the induction heat treatment of said weld. Preferably, said joining machine comprises at least two clamping jaws of said two pairs of clamping jaws which are clamping jaws comprising said part with little interaction with an induction magnetic field.

In particular, said joining machine can be integrated into a treatment installation for strips in reels, in which the end of an unwound strip (i.e. the tail of the first strip 11) in said treatment installation is stopped between clamping jaws known as "output" of the joining machine (i.e. the second upper 21 and lower 31 clamping jaws), while the head of a new strip (i.e. the head of the second strip 12) is brought between the clamping jaws known as "input" (i.e. the first upper 22 and lower 32 clamping jaws) of the joining machine, the two ends of strips thus clamped in the clamping jaws being capable of being cut with a view to presenting geometric characteristics suitable for laser welding, transported by bringing the clamping jaws closer together to a welding position, with a minimum overhang, then welded together by a laser beam moving along the edges to be welded.

In particular, the joining machine according to the invention is characterized in that heat treatment by magnetic induction can be carried out when the ends of strips are clamped, in welding position, in each of the pairs of clamping jaws in close configuration, allowing a slight overhang of said ends of strips in the gap separating said pairs of clamping jaws. Also, the joining machine presented in FIG. 5 is particularly suitable for joining very thin strips the heads and tails of strips of which are intended to be cut by laser prior to production of the weld. Consequently, the space separating the first and second upper clamping jaws can be identical to the space separating the first and second lower clamping jaws. If cutting the ends of strips requires the use of shears, the space separating the first and second lower clamping jaws is capable of being greater than the space separating the first and second upper clamping jaws, so that each lower clamping jaw will be capable of being set back with respect to the upper clamping jaw relative to the end of the strip which it is capable of contacting.

Before welding a first strip unreeled in the treatment installation to a second strip which can be unreeled at the input to the treatment installation, the joining machine according to the invention is capable of clamping the head of the second strip 12 and the tail of the first strip 11 in respectively the first and the second pair of clamping jaws 21, 22, 31, 32, and bringing said pairs of clamping jaws closer together in a position intended for welding the ends of strips. In particular, said joining machine is capable of positioning said ends of strips, while guaranteeing a reduced overhang of said ends of strips emerging from the jaws so as to ensure better relative positioning of the edges of strips to be welded.

In particular, a space separating said clamping jaws situated on the same side of a strip, for example a clearance 2122 between the upper clamping jaws, in particular when they are in close position, can be correlated with a width of an induction coil of the induction head intended for the heat treatment of the strip joining weld. Also, each of the parts 222, 212, 322, 312 with little interaction with a magnetic field is capable of being connected to another part 221, 321, 211, 311, in particular metal, of the clamping jaw to which it belongs. Thus, each clamping jaw according to the invention is formed from at least two parts, on the one hand said part characterized by little interaction of its constituent material with any magnetic field and said other part capable of interacting with a magnetic induction field, which can be linked together.

In particular, a separation 2111 between said other part 221 (or respectively 321) of a first upper clamping jaw 22 (respectively lower 32), and said other part 211 (or respectively 311) of a second upper clamping jaw 21 (respectively lower 31), when said clamping jaws are in close position, is correlated with at least one dimension of the induction head 9 in order to leave free passage of said induction head 9. Said induction head 9 is in particular capable of including at least said induction coil 92 with a width 921 which can be correlated with the clearance 2122 between said parts 222, 212 with little interaction with a magnetic field when the clamping jaws are in close position, i.e. when they present a spatial configuration intended for the production of the weld or heat treatment, and a structure 91 with width 911. In particular, the geometry of said part with little interaction with the magnetic field allows for projection of the latter outside the clamping jaw with a length equal to half the difference between said clearance 2122 and said separation 2111 and in accordance with the entire width of said clamping jaw. Also, a thickness 2121 of said projection of said part 212, 222 is adapted to mechanical and thermal conditions for clamping said strip before and during heat treatment and determines an air gap between the induction head 9 and the strip. Said air gap, i.e. the distance between the plane of the strips capable of being welded and the induction head is thus equal to the thickness of said projection added to a slight clearance 2123 between said induction head 9 and a surface of said projection directed toward said induction head 9, i.e. an upper surface of said projection.

In particular, the first and second lower clamping jaws 31, 32, just like the first and second upper clamping jaws 22, 21, can each include a projection formed by said part 322, 312, the distance between each of the projections of said lower clamping jaws having a value at most equal to said play 2122. Thus, the clamping jaw according to the invention comprises at least one projection, i.e. a part which is capable of going beyond the side of the end of the strip and which is included in said part with little interaction with a magnetic field. In other words, said part with little interaction with a magnetic field is capable of forming a projection capable of going outside the clamping jaw in the direction of an end of strip, i.e. in the direction of the welding zone, and the length of which in the direction of travel of the strip is determined by half the difference of the distances separating the parts capable of generating an induced current of the parts with little interaction with a magnetic field of the two upper or lower clamping jaws.

As an example, the clearance 2122 is at least 3 mm, the width 921 of the coil of the induction head is between 4 and 15 mm, the width 911 of the induction head is between 15 and 30 mm, the separation 2111 is at least equal to the width 911 of the induction head plus 1 mm, the thickness 2121 of said projection is between 4 and 10 mm and the clearance 2123 between said induction head 9 and a surface of said projection directed toward said induction head 9 is between 0.5 and 5 mm.

Finally, the same design of said clamping jaws according to the invention is in particular applicable to a welding machine comprising mechanical shearing means as represented in FIG. 1. In particular, at least one part of said support 81 presented in FIG. 2 is capable of being made of said constituent material. Advantageously, said constituent material is resistant to mechanical and thermal shocks and in particular is not easily polarized by a magnetic field. As an example, this material is an industrial ceramic such as $Si_3N_4$, $Al_2O_3$, AlN.

Figure 6:
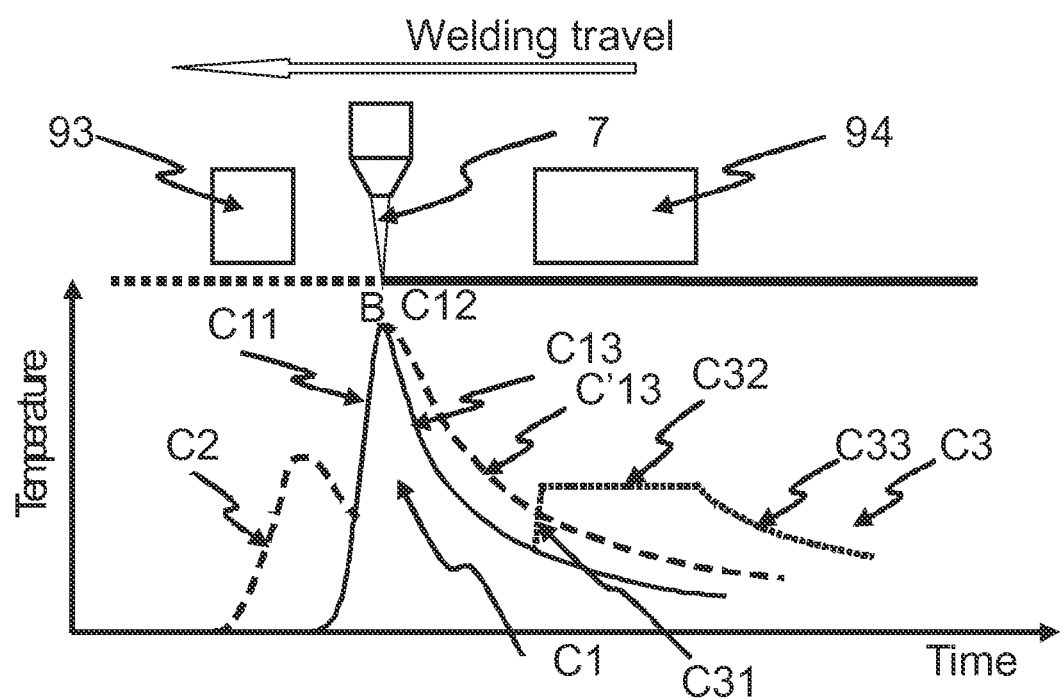

FIG. 6 presents examples of induction heating cycles for a laser joining weld. Beneath the laser beam 7 moving in the direction indicated by the arrow with a view to joining a first end of strip with a second end of another strip, a thermal cycle C1 presents a heating phase C11 ahead of a melting bath B, a maximum temperature phase C12 corresponding to melting of the ends to be welded and to the composition of the melting bath and a cooling phase C13 behind the melting bath.

Under the inductive effect of a first induction head 93 of an induction heat treatment device according to the invention preceding the beam 7, a thermal pre-heating cycle C2 develops which has the effect of slowing a cooling rate C13 to a pace C'13. This reduction in cooling rate has a direct effect on the structure of the material of the zone affected by the weld. For example, this reduction makes it possible to prevent the formation of a martensitic structure under C13 and to encourage a bainitic or perlitic structure under C'13.

Under the inductive effect of a second induction head 94 of the heat treatment device according to the invention, said second induction head 94 being capable of moving by following the beam 7, a thermal re-heating cycle C3 develops which includes a re-heating phase C31, a temperature maintenance phase C32 and a cooling phase C33 which have the effect of applying a softening treatment to the structure of the material of the zone affected by the weld, for example the tempering of a martensitic structure.

Each of the induction heads 93, 94 can be used separately or in cooperation in order to obtain a given metallurgical structure.

In conclusion, the electrical, magnetic geometric and physical characteristics of said parts with little interaction with the magnetic field capable of being included in one or more clamping jaws of a joining machine according to the invention, as well as their cooperation with an induction heat treatment device, make it possible to solve all the problems of mechanical and electromagnetic interference between the clamping jaws and the induction heat treatment device while retaining the possibility of bringing said clamping jaws closer together as in a machine with no induction heat treatment device, and thus continuing to guarantee very precise positioning of the edges to be welded and a high-quality weld.

The invention claimed is:

1. A clamping jaw of a machine for joining thin strips by welding, the clamping jaw comprising:
    at least two parts including a first part reducing an intensity of eddy currents created in the clamping jaw by electromagnetic induction generated by a heat treatment device of the machine for joining the thin strips, and a second part that might be affected by induction heating;
    said first part configured to contact a strip end to be welded to another strip end;
    said first part having a geometry and a constituent material each configured to reduce a strength of eddy currents capable of being created in said second part of the clamping jaw by electromagnetic induction from the heat treatment device of the machine for joining thin strips, said first part defining a projection going outside of the clamping jaw and configured for extending in a direction of a strip end and being a closest of said at least two said parts to the heat treatment device.

2. The clamping jaw according to claim 1, wherein said constituent material is an insulating material.

3. The clamping jaw according to claim 1, wherein said constituent material has a relative magnetic permeability below 5.

4. The clamping jaw according to claim 1, wherein said constituent material has a resistivity above $10^9$ Ω·cm.

5. The clamping jaw according to claim 1, wherein said constituent material has a thermal conductivity above 10 W·m$^{-1}$·K$^{-1}$ and a coefficient of thermal expansion between 2 and 10·10$^{-6}$·K$^{-1}$.

6. The clamping jaw according to claim 1, wherein said geometry of said first part is a geometry complementary to a geometry of the heat treatment device, and said geometry is configured to reduce a magnetic induction flow capable of being induced by the heat treatment device by electromagnetic induction in the clamping jaw and to provide for heat treatment by electromagnetic induction before or after the welding of a strip end to another strip end free from any movement of the clamping jaw relative to the strip end.

7. The clamping jaw according to claim 1, wherein said projection covers, according to a first length, an entire width of the clamping jaw and a width and a length perpendicular to said first length to be defined as a function of at least one dimension of an induction head.

8. A heat treatment device for heat treatment of a weld joining two successive strip ends by electromagnetic induction before or after production of the weld and for adaptation to a machine for joining the strips, the heat treatment device comprising:
 a welding device configured to weld the successive strip ends;
 two pairs of clamping jaws configured to immobilize the strip ends, said two pairs of clamping jaws including at least two clamping jaws according to claim 1; and
 an induction head having a geometric shape complementary to said geometry of said first part of each of said two clamping jaws according to claim 1.

9. The heat treatment device according to claim 8, which further comprises a device configured to move said induction head and to correlate a movement of said induction head with a movement of said welding device.

10. A joining machine for joining successive strip ends in a strip treatment installation, said joining machine comprising:
 a device configured to weld a first strip end to a second strip end of another strip;
 two pairs of symmetrically disposed clamping jaws according to claim 1, a first pair of said clamping jaws configured to grip the first strip end and a second pair of said clamping jaws configured to grip the second strip end, for holding and positioning the first and second strip ends facing one another for welding the strip ends to one another.

11. The joining machine according to claim 10, which further comprises a support at least partially made of said constituent material of said clamping jaw according to claim 1, said support configured to be positioned, during welding, under the first and second strip ends to be welded, and said support configured to cooperate with said clamping jaws according to claim 1 to provide for clamping of the first and second strip ends.

12. The joining machine according to claim 10, which further comprises a heat treatment device according to claim 8.

13. The joining machine according to claim 12, wherein said heat treatment device is configured to be coupled to said welding device.

14. The joining machine according to claim 10, at least a pair of jaws among:
 a pair made of first and second upper clamping jaws; and
 a pair made of first and second lower clamping jaws;
 that is the closest to the induction head includes clamping jaws according to claim 1.

15. The joining machine according to claim 10, wherein the two pairs of symmetrically disposed clamping jaws are clamping jaws according to claim 1.

* * * * *